Patented July 24, 1951

2,561,915

UNITED STATES PATENT OFFICE 2,561,915

STABILIZED VINYL AROMATIC COMPOUNDS

Edwin R. Erickson, Moline, Ill., assignor to Mathieson Chemical Corporation, a corporation of Virginia No Drawing. Application March 11, 1947, Serial No. 733,989

4 Claims. (Cl. 260—650)

My invention relates to a method of inhibiting the polymerization of polymerizable vinyl compounds, particularly polymerizable vinyl compounds, such as nuclear dichlorostyrene, which are highly active in the respect of polymerization. The invention embraces as compositions of matter, polymerizable vinyl aromatic compounds to which have been added the inhibitors employed in the practice of the method.

The inhibitors herein referred to include those disclosed in my copending application Serial No. 528,777 filed March 30, 1944, now Patent No. 2,455,746 dated December 7, 1948.

Polymerizable vinyl aromatic compounds find wide application in industry in the manufacture of plastics and synthetic rubbers. Their use for such purposes follows from their ability to polymerize either additively or with each other, or with other polymerizable monomers, aliphatic dienes, such as butadiene, for example. For obvious reasons premature polymerization of a vinyl aromatic compound, occurring as during shipment or storage or during a distillation operation being conducted for the purpose of purifying the monomeric material, is undesirable.

In accordance with the present invention, I retard or prevent the polymerization of polymerizable vinyl aromatic compounds by incorporating therewith the product obtained when a hydrocarbon chloride is reacted, in the presence of stannic chloride, with a compound of the formula,

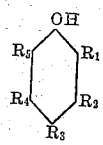

in which $R_1$, $R_2$, and $R_3$ may be hydrogen, hydroxy, or a substituted or unsubstituted hydrocarbon group, and in which $R_4$ and $R_5$ may be hydrogen or a substituted or unsubstituted hydrocarbon group; provided, however, that at least one unsubstituted hydrogen atom is present and that at least one of $R_1$ and $R_3$ is hydroxy. Preferred compounds within the scope of the formula are hydroquinone, catechol and pyrogallol.

Hydrocarbon chlorides employed in the practice of the invention include alkyl, aryl, alkaryl, and alicyclic chlorides containing from 1 to upwards of 18 carbon atoms. Elements other than halogen, oxygen, for example, or radicals such as hydroxy, may be present in the molecule where there is no interference with the reaction or with the properties of the reaction product responsible for its polymerization inhibiting action. In general, I prefer those hydrocarbon chlorides containing an intermediate number of carbon atoms, viz., from about 4 to 12 carbon atoms, and I particularly prefer those containing a number of carbon atoms within the lower portion of this range. Thus, tertiary butyl chloride is a particularly preferred hydrocarbon chloride for use in the practice of my invention.

Substituted hydrocarbon groups which may form part of the molecule of the polyhydroxy compound with which the hydrocarbon chloride is reacted may also comprise oxygen, as an ether linkage, for example, or they may contain one or more halogen atoms or hydroxy radicals, for example. Similarly to the case of the hydrocarbon chloride it is preferred that groups attached to the ring nucleus of the polyhydroxy compound contain at least 4 but not more than about 12 carbon atoms, but groups containing a greater or lesser number of carbon atoms are not without the scope of the invention.

The reaction in the presence of stannic chloride is believed to yield, essentially, a condensate comprising at least one group derived from the hydrocarbon halide. As a matter of convenience, the reaction product will be hereinafter referred to as a substituted polyhydroxy benzene.

My invention is based on the discovery that a substituted polyhydroxy benzene prepared by a condensation reaction involving the use of stannic chloride as the condensing agent is far more effective as an inhibitor of the polymerization of vinyl aromatic compounds than substituted polyhydroxy benzenes prepared with other condensing agents, zinc chloride, ferric chloride, or aluminum chloride, for example. I cannot offer any explanation for this phenomenon. Many organo tin compounds which I tested proved to be very poor inhibitors.

As previously indicated, the substituted polyhydroxy benzenes prepared with stannic chloride as the condensing agent are particularly effective polymerization inhibitors for substitution products of styrene, such as nuclear dichlorostyrene, which polymerizes more readily than styrene itself. However, my inhibitors can be used with styrene with excellent results, also with styrene homologs and substitution products whose activity with respect to polymerization compares with styrene.

Among the many compounds other than nuclear dichlorostyrene to which my invention may be applied may be mentioned: nuclear alkylated styrenes, alpha-alkyl styrenes such as alpha-methyl styrene and alpha-ethyl styrene, alpha-alkyl halostyrenes, nuclear chlorostyrenes containing more than 2 nuclear chlorine atoms, the styrene compound derived from ethyl p-ethyl-benzoate by dehydrogenation of the ring ethyl group, vinyl naphthalenes, divinyl benzene, nuclear chlor-substituted vinyl naphthalenes, etc. Also, vinyl heterocyclic compounds of aromatic character, such as vinyl pyridine and vinyl thiophene may be stabilized by means of the inhibitors of the invention.

The optimum proportion of inhibitor varies depending upon the particular vinyl aromatic compound to be stabilized, its proneness toward polymerization and other factors including the treatment to which the compound is to be subjected prior to its ultization. In some cases, an amount as low as about 0.001% on the weight of the vinyl aromatic compound may be adequate. Generally, less than 1% of the inhibitor is sufficient, but larger amounts up to about 5% or more may be used, especially if the vinyl aromatic compound is apt to be exposed to conditions favoring its premature polymerization. Where the substituted polyhydroxy benzene is insufficiently soluble in the polymerizable monomer, a mutual solvent for the inhibitor and the monomer may be used.

Incorporation of the inhibitor in the vinyl aromatic compound may be accomplished simply by addition of the inhibitor with stirring, but in large scale operations it may be more advantageous to effect the incorporation in some other way as by percolating the vinyl aromatic compound through a layer or bed of the inhibitor. Many of the inhibitors, because of their substantial solubility, may be conveniently incorporated by preparing a concentrated solution of the inhibitor in the monomer to be stabilized and adding this concentrated solution to larger quantities of the monomer.

The substituted polyhydroxy benzenes may be used individually or in admixture or they may be used in conjunction with other inhibitors. Where protection against polymerization is desired in a distillation operation, it is frequently advantageous to employ two inhibitors, one of which is substantially less volatile than the monomer being distilled, and the other of which is slightly more volatile. In this way the protection extends throughout the distillation system since the higher boiling inhibitor will prevent polymerization in the kettle, while the lower boiling inhibitor will prevent polymerization in the fractionating column. In a few cases, it is possible to select an inhibitor whose volatility characteristics are such that while it will remain largely in the kettle a sufficient quantity will distill at the operating temperature to afford adequate protection in the column.

My inhibitors are readily removed by simply washing the stabilized material with an aqueous solution of an alkali, such as caustic soda, or the like.

My invention is illustrated by the following specific examples which are in part comparative. In the "induction" test referred to in the examples, a given amount of the inhibitor is added to nuclear dichlorostyrene and the inhibited mixture heated over a boiling water bath. Samples of the mixture are removed periodically and added to a small amount of methanol. Since polymeric dichlorostyrene is insoluble in methanol easily observable white curds form when polymerization has started in the mixture being heated. The number of minutes heating before the curds form is a measure of the effectiveness of the inhibitor and is designated the "induction" period. The induction period on uninhibited dichlorostyrene is from 1 to 3 minutes.

*Example 1*

340 gms. of tertiary butyl chloride was refluxed with 88 gms. of catechol and 17.9 gms. of stannic chloride for about 30 minutes. On cooling, the mixture solidified. The solid was washed on a filter with cold ligroin, air dried, and pulverized. 0.1% of the material in nuclear dichlorostyrene gave an induction period of 217 minutes.

For comparison, the experiment was repeated using zinc chloride as the condensing agent. In this case the induction period was only 30 minutes. With aluminum chloride the result was even poorer, the induction period being only 14 minutes.

For still further comparison, 5 gms. of ferric chloride, 44 gms. of catechol and 200 ml. of tertiary butyl chloride were similarly refluxed, and the product washed, dried and tested. 0.5% of the product in dichlorostyrene gave an induction period of only 21 minutes.

*Example 2*

A mixture of 25.2 gms. of pyrogallol, 150 ml. of tertiary butyl chloride and 4 ml. of stannic chloride was refluxed for 140 minutes. The cooled mixture was diluted with 75 ml. of ligroin and placed in a refrigerator for two hours. Thereafter part of the solvent was distilled off under reduced pressure and the residue cooled to crystallize out the product which was filtered and washed with cold ligroin. 0.1% of the product in dichlorostyrene gave induction periods of 62 and 67 minutes in two tests. Prepared using other metal chlorides as the condensing agent the product gave an induction period of only 38 minutes when dissolved to the extent of 0.25% in dichlorostyrene.

*Example 3*

Monotertiary butyl catechol was reacted with tertiary butyl chloride in the presence of a minor amount of stannic chloride. 0.05% of the product in dichlorostyrene gave an induction period of 133 minutes as compared with 21 minutes when the product was prepared using condensing agents other than stannic chloride.

*Example 4*

A mixture of 37 grams of 2,5 dihydroxydiphenyl, 75 ml. of tertiary butyl chloride and 1 ml. of stannic chloride was refluxed for 45 minutes. At the end of the reaction 75 ml. of ligroin was added and the mixture cooled to crystallize out the product which when dissolved in dichlorostyrene to the extent of 0.05% gave an induction period of 92 minutes.

*Example 5*

A mixture containing 33.2 gms. of tertiary butyl catechol, 42 gms. of mixed chloroethyldichlorobenzenes having a refractive index of 1.5583–1.5590 and 1 ml. of stannic chloride was refluxed in 50 ml. of hexane for 3.5 hours. Upon completion of the reaction 150 ml. of hexane was added and the hot solution filtered through charcoal. After removal of excess solvent by distillation under reduced pressure, a black solid was obtained which when dissolved in dichlorostyrenes to the extent of 0.1% gave an induction period of 103 minutes.

The terms "polymerize," "polymerizable," and "polymerization" are used herein in a general sense to include interpolymerization between unlike molecules, as well as union of two or more like molecules by addition.

I claim:

1. A normally polymerizable vinyl aromatic compound which has been stabilized to prevent its polymerization by the incorporation of a small amount of the product obtained by reacting at reflux temperature and in the presence of a catalytic amount of stannic chloride, a hydrocarbon chloride and a compound of the formula,

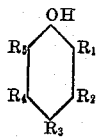

in which $R_1$, $R_2$ and $R_3$ are radicals selected from the group consisting of hydrogen, hydroxy and a hydrocarbon group, and in which $R_4$ and $R_5$ are radicals selected from the group consisting of hydrogen and a hydrocarbon group; provided, however, that at least one hydrogen atom is present and that at least one of $R_1$ and $R_3$ is hydroxy.

2. Nuclear dichlorostyrene which has been stabilized against polymerization by the incorporation of a small amount of the product obtained by reacting tertiary butyl chloride and hydroquinone at reflux temperature in the presence of stannic chloride.

3. Nuclear dichlorostyrene which has been stabilized against polymerization by the incorporation of a small amount of the product obtained by reacting tertiary butyl chloride and catechol at reflux temperature in the presence of stannic chloride.

4. Nuclear dichlorostyrene which has been stabilized against polymerization by the incorporation of a small amount of the product obtained by reacting tertiary butyl chloride and pyrogallol at reflux temperature in the presence of stannic chloride.

EDWIN R. ERICKSON.

REFERENCES CITED

The following references are of record in the file of this patent:

UNITED STATES PATENTS

| Number | Name | Date |
|---|---|---|
| 2,181,102 | Stoesser et al. | Nov. 21, 1939 |
| 2,212,478 | Miller | Aug. 20, 1940 |
| 2,295,077 | Dreisbach et al. | Sept. 8, 1942 |